US008495309B2

(12) United States Patent
Richards (10) Patent No.: US 8,495,309 B2
(45) Date of Patent: Jul. 23, 2013

(54) VARIABLE LENGTH DATA PROTECTED BY SEQLOCK

(75) Inventor: Wade Richards, Vancouver (CA)

(73) Assignee: Business Objects Software Limited, Dublin (IE)

(*) Notice: Subject to any disclaimer, the term of this patent is extended or adjusted under 35 U.S.C. 154(b) by 287 days.

(21) Appl. No.: 12/909,865

(22) Filed: Oct. 22, 2010

(65) Prior Publication Data

US 2012/0102282 A1 Apr. 26, 2012

(51) Int. Cl.
*G06F 12/14* (2006.01)
(52) U.S. Cl.
USPC .................................. 711/150; 711/E12.091
(58) Field of Classification Search
None
See application file for complete search history.

(56) References Cited

U.S. PATENT DOCUMENTS

| | | | | |
|---|---|---|---|---|
| RE35,881 E | * | 8/1998 | Barrett et al. | 707/758 |
| 2002/0143521 A1 | * | 10/2002 | Call | 704/1 |
| 2004/0047362 A1 | * | 3/2004 | Menth et al. | 370/412 |
| 2011/0320724 A1 | * | 12/2011 | Mejdrich et al. | 711/125 |

OTHER PUBLICATIONS

Christian, Jim. Flatterms, discrimination nets, and fast term rewriting. Journal of Automated Reasoning. Feb. 1, 1993. Springer Netherlands. vol. 10. pp. 95-113.*
Josh Triplett, Paul E. McKenney, and Jonathan Walpole. 2010. Scalable concurrent hash tables via relativistic programming. SIGOPS Oper. Syst. Rev. 44, 3 (Aug. 2010), 102-109.*
Wikipedia; Seglock; Jul. 12, 2010; Wikipedia; (http://en.wikipedia.org/w/index.php?title=Seglock&oldid=363365100).
Corbet Jonathan, Greg Kroah-Hartman and Alessandro Rubini; Alternatives to Locking; Linux Device Drivers; 2005; 3rd Edition, Chapter 5 and Section 7, ISBN : 0-596-00590-3; O'Reilly, Sebastopol, CA, USA; (http://www.makelinux.net/ldd3/chp-5-sect-7.shtml).
Christoph Lameter; Effective Synchronization on Linux/NUMA Systems; In proceedings of May 20, 2005 Gelato Conference, San Jose, CA; See p. 15 & 16; Silicon Graphics Inc., Fremont, CA, USA; (http://ftp.dkuug.dk/kernel/linux/kernel/people/christoph/gelato/gelato2005-paper.pdf).

* cited by examiner

*Primary Examiner* — Edward Dudek, Jr.
*Assistant Examiner* — Ralph A Verderamo, III (57) ABSTRACT

Various embodiments of systems and methods for variable length data protected by Seqlock are described herein. Seqlock is a special locking mechanism used in data structures for multithreaded applications that can be read very quickly, when there are no changes being made, at the cost of needing to repeat a read operation when writing has occurred. A Seqlock, in normal use, can only protect a fixed-size data structure with no pointers. This is because the writing thread may invalidate a pointer after a reading thread has followed it. The embodiments specify an algorithm where a Seqlock-protected pointer, once written, is never invalidated. This removes the "no pointers" restriction, allowing the Seqlock to protect a simple singly-linked list, which can be safely increased in size while being read by other threads. The innovation includes the use of the write-once head and next pointers, and the always valid end iterator.

20 Claims, 8 Drawing Sheets

VARIABLE LENGTH DATA PROTECTED BY SEQLOCK

FIELD

The field relates to memory locking mechanisms that avoid the problem of writer starvation. More precisely, the field relates to the Sequence Lock (seqlock) technique with the ability to store variable length data structures.

BACKGROUND

A seqlock is a special locking mechanism for supporting fast writes of shared variables. It is a reader-writer consistent mechanism which avoids the problem of writer starvation. Writer starvation means that as long as at least one reading thread holds the lock, no writer thread will be able to acquire it. The seqlock consists of storage for saving a sequence number in addition to the lock. The lock is to support synchronization between two writers and the counter is for indicating consistency in readers. In addition to updating the shared data, the writer increments the sequence number, both after acquiring the lock and before releasing the lock. Readers read the sequence number before and after reading the shared data. If the sequence number is odd on either occasion that may mean the writer had taken the lock while the data was being read and it may have changed. If the sequence numbers are different, that may mean a writer has changed the data while it was being read. In either case, readers simply retry (using a loop) until they read the same even sequence number before and after. The reader never blocks, but it may have to retry if a write is in progress; this speeds up the readers in the case where the data was not modified, since they do not have to acquire the lock as they would with a traditional read-write lock. Also, writers do not wait for readers, whereas with traditional read-write locks they do, leading to potential resource starvation in a situation where there are a number of readers (because the writer must wait for there to be no readers). Because of these two factors, seqlocks are more efficient than traditional read-write locks for the situation where there are many readers and few writers. The drawback is that if there is too much write activity or the reader is too slow, in this case the readers may starve. It should also be noted that the technique will not work for data that contains pointers, because any writer could invalidate a pointer that a reader has already followed.

SUMMARY

Various embodiments of systems and methods for variable length data protected by seqlock are described herein. In one embodiment, the method includes allocating a first portion of memory to be protected by a lock mechanism for synchronization between writers and an associated sequence number for indicating consistency to readers of the first portion of memory. The method also includes initializing a set of pointers within the first portion of memory to null pointers and initializing a pointer within the set of pointers, the pointer pointing to a second portion of memory forming a linked list.

In other embodiments, the system includes at least one processor for executing program code and memory for storing data structures with pointers. The system further includes a seqlock allocator module within the memory, the seqlock allocator module to allocate portions of memory to be protected by a lock mechanism and an associated sequence number, wherein the lock mechanism supports synchronization between one or more writers accessing the allocated portions of memory and the associated sequence number indicates consistency to one or more readers of the allocated portions of memory. The system also includes a pointer initializer module within the memory, the pointer initializer module to initialize all pointers within the allocated portions of memory.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for variable length data protected by seqlock are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
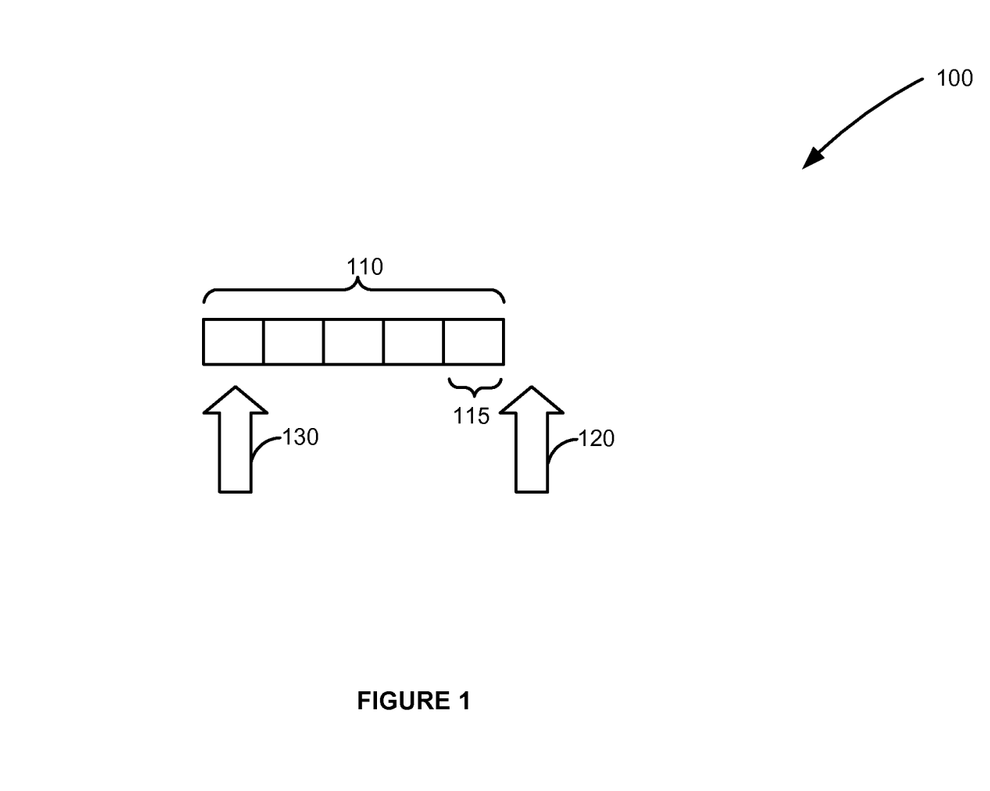
FIG. 1 is a block diagram representing a collection of data with an accessing iterator and an end iterator.

The conventional seqlock technique is unable to store data structures which include pointers to other memory, thus limiting the capacity of the data to a fixed size of data. An iterator is an object that allows a programmer to traverse through all the elements of a collection, regardless of its specific implementation, thus performing reading of data. An "end iterator" is a special pointer, which refers to "one past the end" of a valid data structure. FIG. 1 represents a block diagram 100 of a typical collection of valid data 110 with an end iterator 120 pointing just past the last valid data 115. As an accessing iterator 130 steps through the collection of data 110, once the accessing iterator 130 has the same value as the end iterator 120, the collection is complete. For an algorithm which steps through the collection of data 110 to work, it must be guaranteed, that a valid iterator, which is repeatedly incremented such as the accessing iterator 130, will eventually be equal to the value of the end iterator 120. If the list of valid data 110 changes size after the value of the end iterator 120 is retrieved by linking the collection of data 110 to a second collection of data as is typically done in a "linked list of arrays" implementation (for example if a writer thread is appending to the list of valid data 110 while a reader thread is iterating over it), the accessing iterator 130 will jump from pointing to data 115 to the first data in the second collection of the list, and will never be equal to the end iterator 120, which will cause undefined and undesirable program behavior.

In one embodiment, the disadvantage of the conventional seqlock technique of not containing data structures that include pointers is overcome by ensuring that all pointers, which are accessed by reader threads, are never invalidated by writer threads. This allows the data protected by a seqlock technique to include a linked list of data blocks, thus increasing the amount of data that can be stored, while retaining its lockless read performance.

Figure 2:
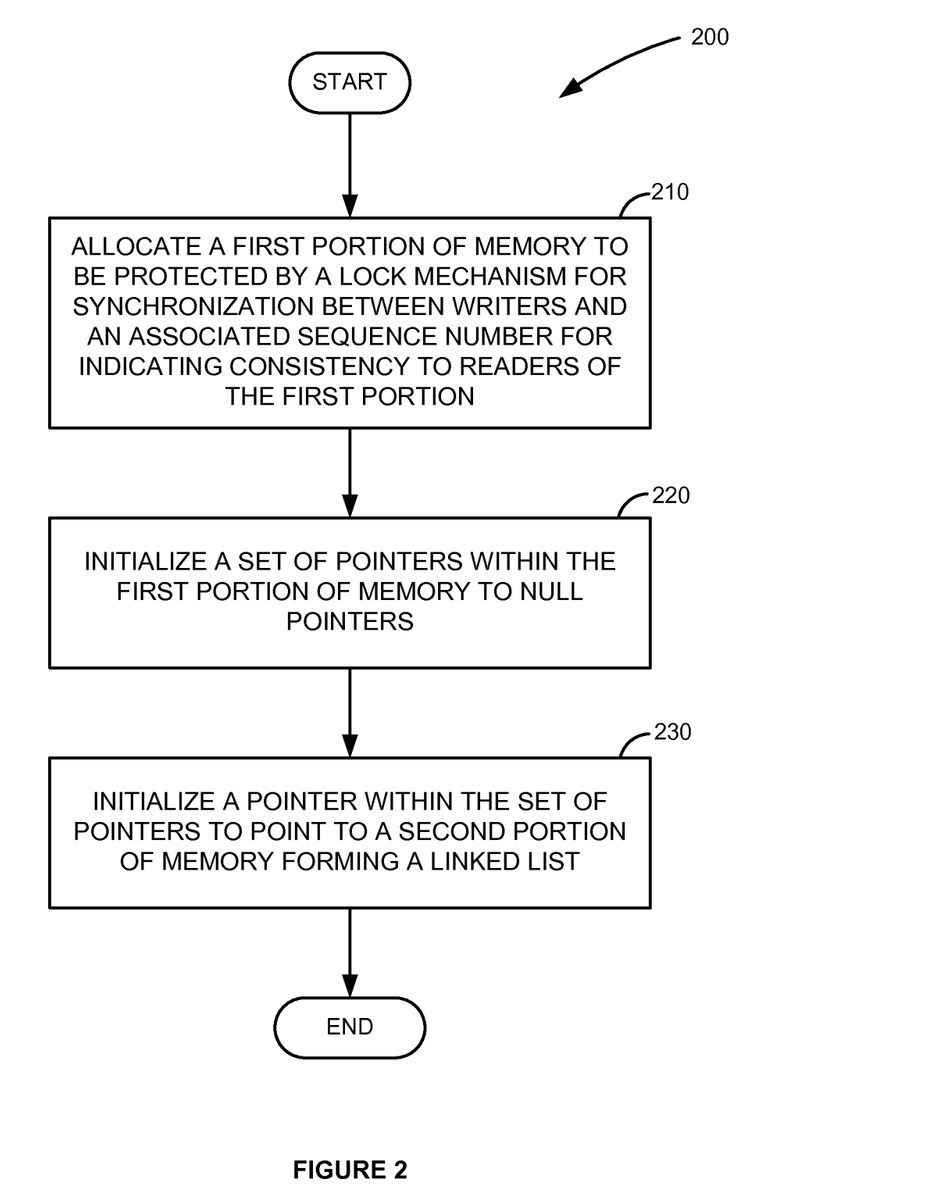
FIG. 2 is a flow diagram of an embodiment of a method for storing data structures with pointers.

FIG. 2 is a flow diagram of an embodiment of a method 200 for storing data structures with pointers. The method begins at block 210 with allocating a first portion of memory to be protected by a lock mechanism for synchronization between writers and an associated sequence number for indicating consistency to readers. This means the data within this portion of memory is protected by a write lock and the readers refer to a counter for indicating consistency when reading. In one embodiment, the lock mechanism and the associated sequence number operate in accordance with the seqlock technique.

At block 220, a set of pointers within the first portion of memory are initialized as null pointers. Initializing a pointer as a null pointer means the pointer is initialized to a fixed value known not to refer to any valid memory address. This means a null pointer does not point to any other portion of memory.

At block 230, a pointer within the set of pointers is initialized, the pointer pointing to a second block of memory forming a linked list. In one embodiment, the linked list is singly-linked. A singly-linked list is a data structure that consists of a sequence of data records such that in each record there is a field that contains a reference (link) to the next record in the sequence. In one embodiment, the pointer within the first portion of memory remains unchanged, which ensures the second portion of memory is never invalidated. When a pointer to newly allocated portion of memory is written into memory protected by seqlock, that memory is never de-allocated or used for any other purpose for the duration of the program. Thus, all pointers within a linked list protected by a seqlock technique are either a null pointer or a pointer to a memory portion which is valid and will remain valid until the program execution completes. In one embodiment, the pointers within a linked list protected by a seqlock technique are referred to as write-once pointers. In one embodiment, the pointer within a first portion of memory in a linked list is called head pointer and the pointers within the next portions of memory are called next pointers.

In one embodiment, the method, as described in connection to FIG. 2, is performed without a lock for synchronization between writers as there is only one writer to the protected portion of memory and thus no lock mechanism for synchronization between writers is needed.

Figure 3:
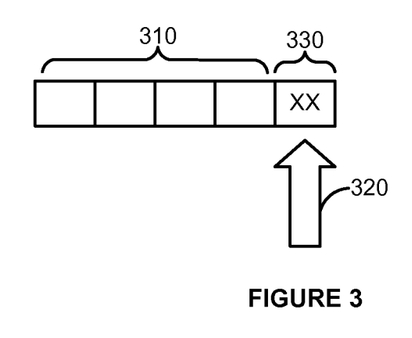
FIG. 3 is a block diagram representing a collection of data with an always valid end iterator.
Figure 4:
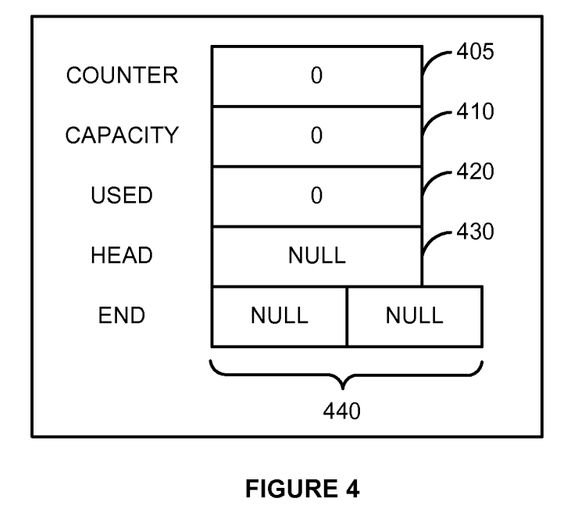
FIG. 4 is a block diagram representing a data structure protected by seqlock according to an embodiment for variable length data protected by seqlock.
Figure 5:
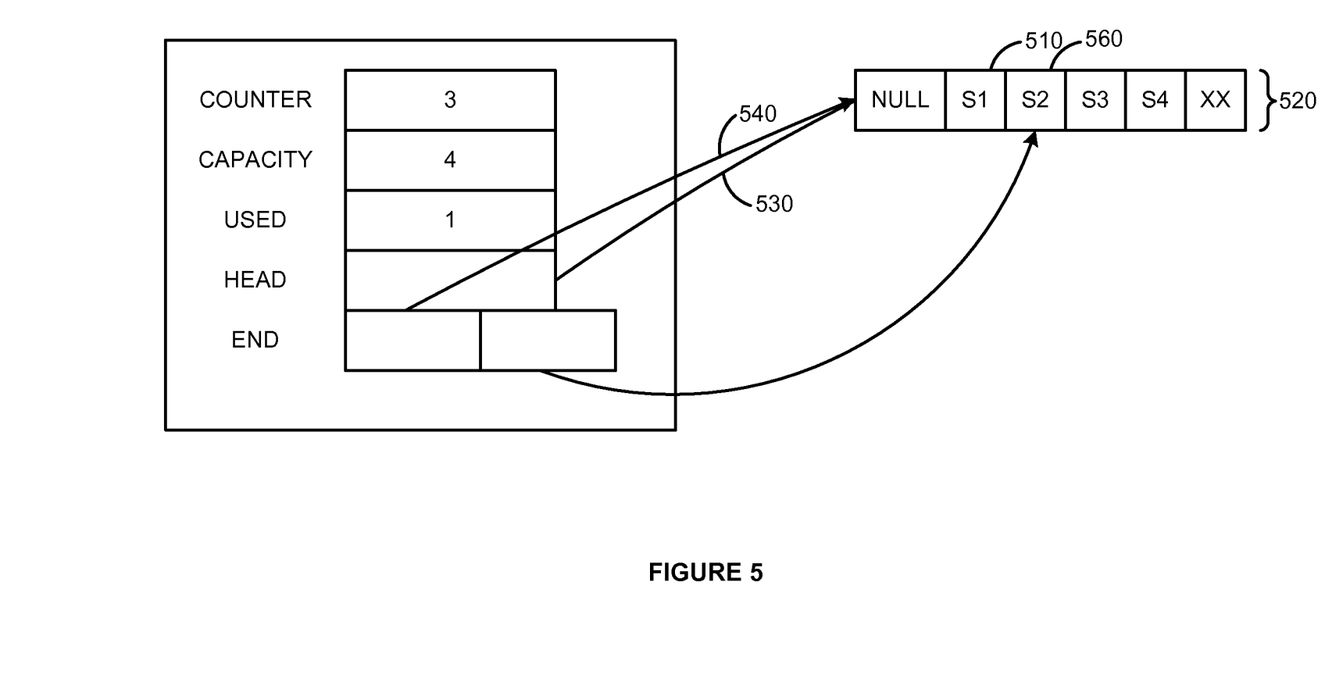
FIG. 5 is a block diagram representing addition of an element to data protected by seqlock according to an embodiment for variable length data protected by seqlock.

In one embodiment, the method as described in connection to FIG. 2 is performed together with an always valid end iterator. An always valid end iterator is an iterator that points to a reserved unit of managed memory, which remains valid even if the list of valid data changes size. This ensures that all pointers, which are accessed by reader threads, are never invalidated by writer threads. In contrast to the conventional seqlock technique where the end iterator is pointing just past the last valid data (FIG. 1), in FIG. 3, the always valid end iterator 320 points to a valid data 330 following a collection of data 310.

Figure 6:
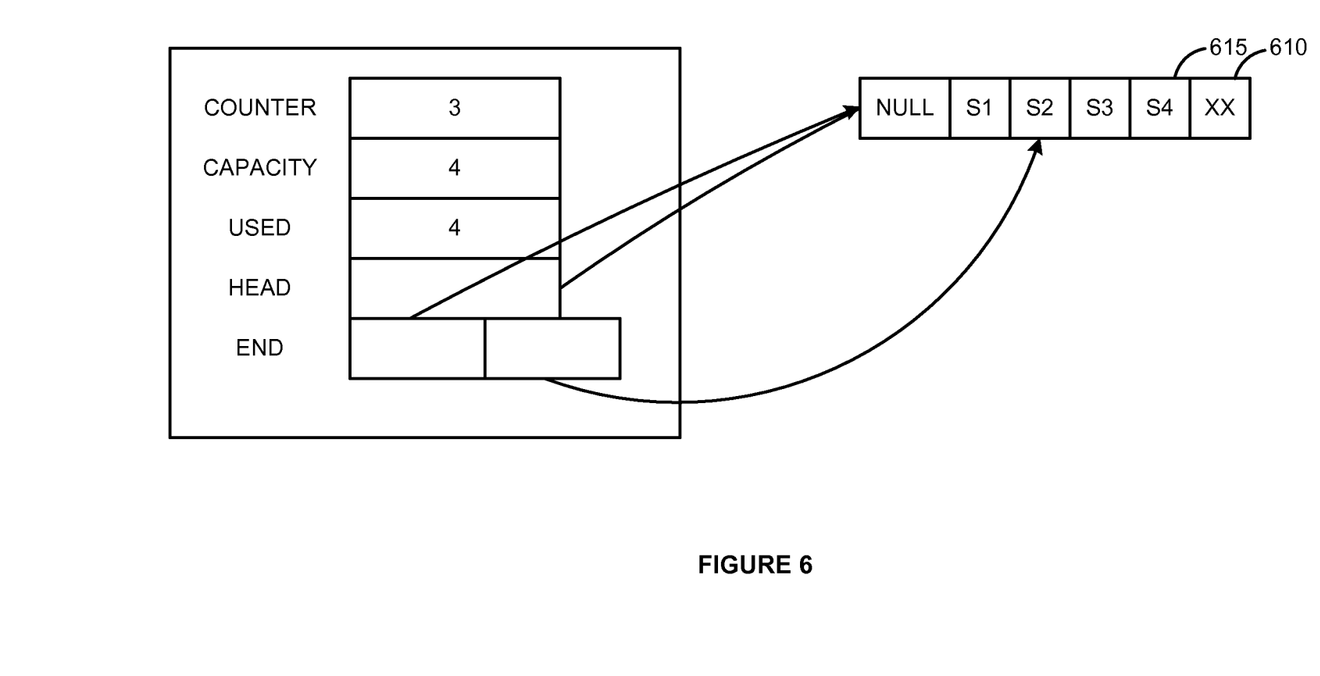
FIG. 6 is a block diagram representing a data structure protected by seqlock according to an embodiment for variable length data protected by seqlock.
Figure 7:
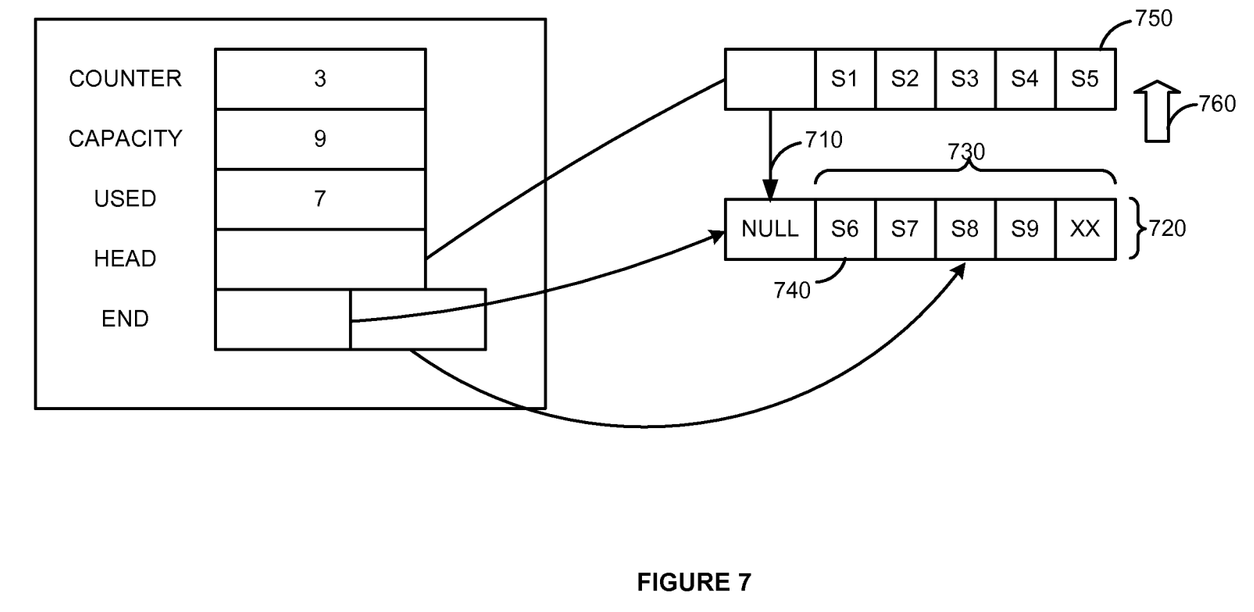
FIG. 7 is a block diagram representing expansion to next portion of memory protected by seqlock according to an embodiment for variable length data protected by seqlock.

FIGS. 4-7 represent data structures protected by seqlock according to embodiments for variable length data protected by seqlock. In one embodiment, there is a portion which is directly part of the data protected by seqlock, and zero or more data portions which are not directly within the memory range protected by the seqlock. As presented in FIG. 4, the portion directly protected by a seqlock technique contains the seqlock counter 405, list's current capacity (number of data slots) 410, the number of slots in use 420, a head pointer 430 to the first portion of memory, which is not directly within the seqlock protected memory, and an always valid end iterator 440 pointing to the last portion of data in the chain, and the last memory slot within that portion of data. The seqlock counter 405 is the sequence number that writers increment while acquiring and releasing the lock when writing to the data. In one embodiment, the list's current capacity 410 is referred to as "current-capacity variable". In one embodiment, the number of slots in use 420 is referred to as "slots-in-use variable". The head pointer and the always valid end iterator remain null pointers till they are initialized. As shown in FIG. 7, each of the memory portions, which are not in the memory range protected by seqlock, contains a next pointer 710 to the next such portion of memory 720, and a number of memory slots 730, which can be used. By way of example, FIGS. 4-7 show five memory slots that can be used for storing data in each portion of memory, but any number greater than one may be used. Each iterator for such portion of memory consists of a pointer to the portion of memory (pBlock) and a pointer to the data slot (pData) within the portion of memory. When incrementing an iterator, the logic is: if pData does not point to the highest slot in the current portion, increment pData. Such situation is presented in FIG. 5 where the element "S1" 510 is added. As there is only one portion of memory 520 in this case, the pointer to the first block of data 530 falls in the always valid end iterator pointing at the last portion of memory in the chain 540, and the last memory slot is "S2" 560, following the added element "S1" 510. If pData does point to the highest slot in the current portion, as presented by slot "XX" 610 in FIG. 6, pBlock is set to the next portion of memory in the chain like portion 720 in FIG. 7, and pData is set to the first element of that portion, for example slot "S6" 740 in FIG. 7.

This algorithm works with the "always valid end iterator" by ensuring that if a reader thread has a copy of the end iterator, the end iterator pointing at the last data slot 610 in FIG. 6, and while the reader is iterating through the collection, if a writer expands the list as in FIG. 7, then the end iterator (pointing at 610 just past "S4" 615) will always be reached. If the data structure used the typical approach of setting the end iterator 760 in FIG. 7 to point to just past "S5" 750, then when an iterator increments from "S5" 750, it would point to the new "S6" 740, and therefore never actually reach the end indicated by the typical not always valid end iterator 760.

Figure 8:
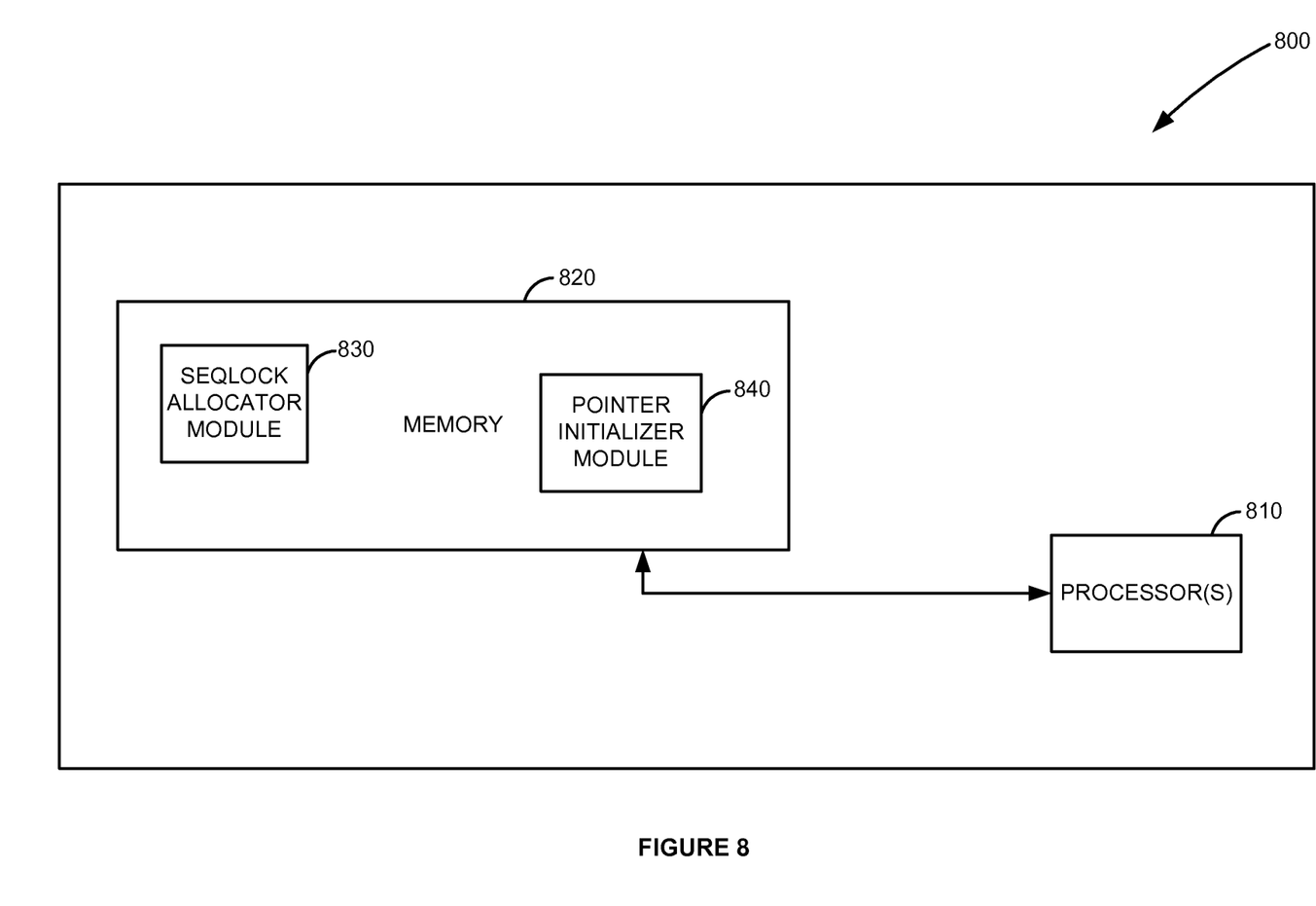
FIG. 8 is a block diagram of an embodiment of a system for storing data structures with pointers.

FIG. 8 is a block diagram of an embodiment of a computer system 800 for storing data structures with pointers. The system includes one or more processors 810 for executing program code. Computer memory 820 for storing data structures with pointers is in connection to the one or more processors 810. The memory 820 also includes a seqlock allocator module 830 and a pointer initializer module 840. The seqlock allocator module 830 is intended to allocate portions of memory to be protected by a lock mechanism and an associated sequence number. The lock mechanism supports synchronization between one or more writers accessing the allocated portions of memory, and the associated sequence number indicates consistency to one or more readers of the allocated portions of memory. In one embodiment, the lock mechanism and the associated sequence number are operated in accordance with the seqlock technique. The pointer initializer module 840 is intended to initialize all pointers within the allocated portions of memory. In one embodiment, the pointer initializer module 840 initializes all pointers within the allocated portions of memory protected by the seqlock technique as null pointers. In another embodiment, the pointer initialize module initializes a pointer within one portion of memory to point to another portion of memory, thus forming a singly-linked list of data structures protected by the seqlock technique. In one embodiment, a pointer pointing at another portion of memory remains unchanged, thus ensuring the linked portions of memory are never invalidated. Thus none non-null pointers are ever changed. In a conventional list or list-of-array structure, pointers to data blocks can be changed as new items are added to the data structure, or old items are removed from it. In this data structure, once a portion of memory is added to the list, it is never removed, and once a pointer data field is assigned a non-null value, that value is never changed.

In one embodiment, the seqlock technique is performed by an always valid end iterator. An always valid end iterator points to a location in memory, which is valid and is either currently in use, or may come in use once more items are added to the data structure. This ensures that as an iterator is stepping through the list and being compared with a copy of the data structure's end iterator, it will eventually reach the value of the end iterator copy. In a conventional list or list-of-array data structure, when the data structure increases in size after the end iterator is copied, no iterator stepping through the list will ever reach that value. This would result in undefined behavior, usually a program "crash". The outcome is that one or more threads can read from the data structure at the same time as another thread is writing to the data structure, with no possibility of invalid iterators or pointers leading to a software crash. In one embodiment, the portions of memory protected by the seqlock technique include shared variables between a first parallel operating system routine and a second parallel operating system routine.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 9:
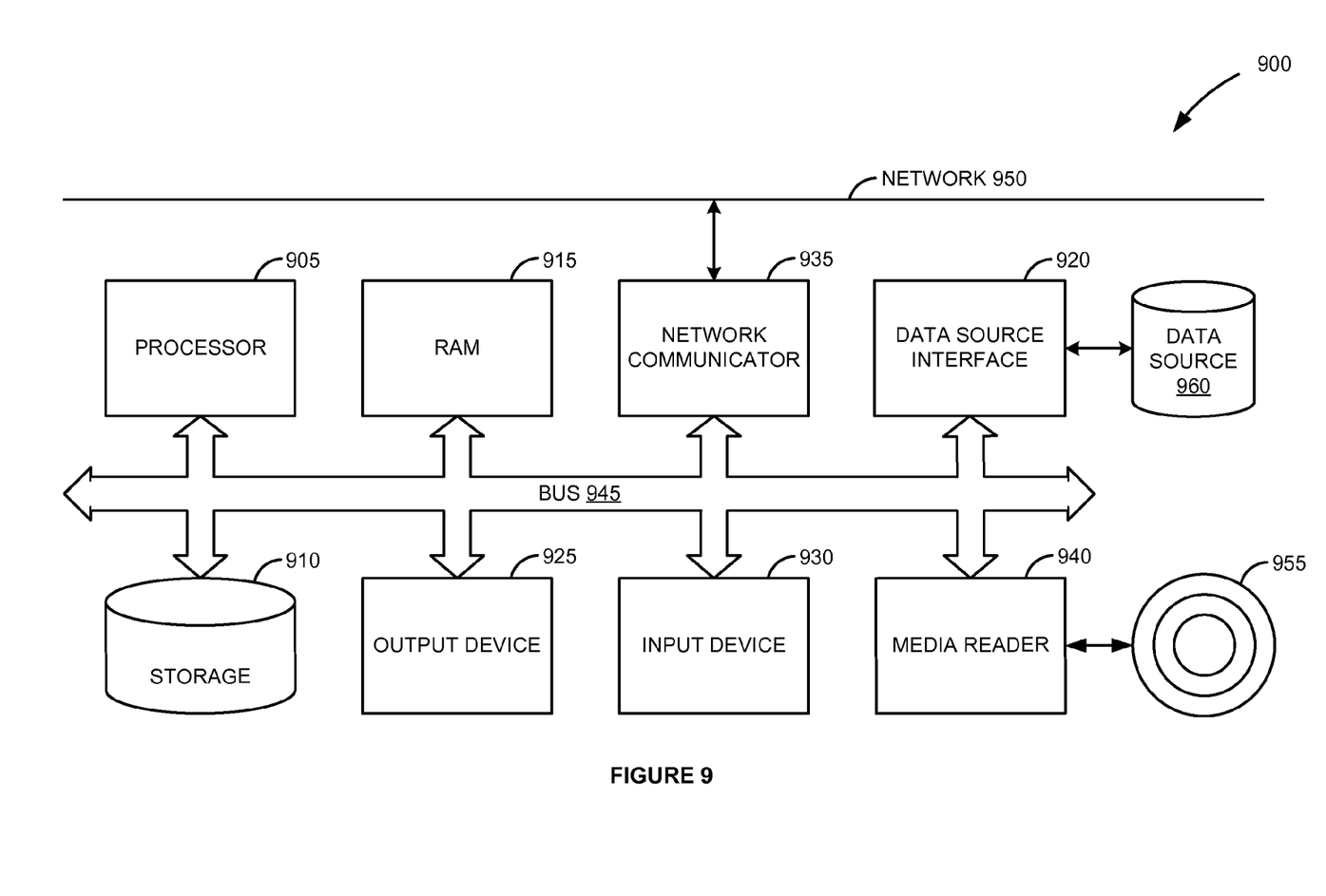
FIG. 9 is a block diagram illustrating a computing environment in which the techniques described for variable length data protected by seqlock can be implemented, according to an embodiment of the invention.

FIG. 9 is a block diagram of an exemplary computer system 900. The computer system 900 includes a processor 905 that executes software instructions or code stored on a computer readable storage medium 955 to perform the above-illustrated methods of the invention. The computer system 900 includes a media reader 940 to read the instructions from the computer readable storage medium 955 and store the instructions in storage 910 or in random access memory (RAM) 915. The storage 910 provides a large space for keeping static data where at least some instructions could be stored for later execution. The stored instructions may be further compiled to generate other representations of the instructions and dynamically stored in the RAM 915. The processor 905 reads instructions from the RAM 915 and performs actions as instructed. According to one embodiment of the invention, the computer system 900 further includes an output device 925 (e.g., a display) to provide at least some of the results of the execution as output including, but not limited to, visual information to users and an input device 930 to provide a user or another device with means for entering data and/or otherwise interact with the computer system 900. Each of these output devices 925 and input devices 930 could be joined by one or more additional peripherals to further expand the capabilities of the computer system 900. A network communicator 935 may be provided to connect the computer system 900 to a network 950 and in turn to other devices connected to the network 950 including other clients, servers, data stores, and interfaces, for instance. The modules of the computer system 900 are interconnected via a bus 945. Computer system 900 includes a data source interface 920 to access data source 960. The data source 960 can be accessed via one or more abstraction layers implemented in hardware or software. For example, the data source 960 may be accessed by network 950. In some embodiments the data source 960 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. An article of manufacture including a non-transitory computer readable storage medium to tangibly store instructions, which when executed by a computer, cause the computer to:

allocate portions of memory to be protected by a lock mechanism and an associated sequence number, wherein the lock mechanism supports synchronization between one or more writers accessing the allocated portions of memory, and the associated sequence number indicates consistency between one or more readers of the allocated portions of memory; and initialize a pointer within a first portion of memory of the allocated portions of memory, the pointer pointing at a second portion of memory of the allocated portions of memory forming a linked list to be protected by the lock mechanism and the associated sequence number, wherein the pointer within the first portion of memory remains unchanged.

2. The article of manufacture of claim 1, further comprising instructions to define a write-once head pointer and one or more next pointers in the linked list.

3. The article of manufacture of claim 1, further comprising instructions to define a current-capacity variable for the number of data slots in the linked list.

4. The article of manufacture of claim 1, further comprising instructions to define a slots-in-use variable for the number of used data slots in the linked list.

5. The article of manufacture of claim 1, wherein the pointer within the first portion of memory points to a first data slot in the second portion of memory.

6. The article of manufacture of claim 1, further comprising instructions to define an always valid end iterator pointing to a last data slot in the linked list right after a last used data slot in the linked list.

7. The article of manufacture of claim 6, wherein the always valid end iterator further points to a last portion of memory containing the last data slot in the linked list.

8. The article of manufacture of claim 1, wherein the linked list is singly linked 9. The article of manufacture of claim 1, wherein the portions of memory include shared variables between a first parallel operating system routine and a second parallel operating system routine.

10. The article of manufacture of claim 1, wherein the lock mechanism and the associated sequence number are operated in accordance with the seqlock technique.

11. A computer implemented method for storing data structures with pointers, the method comprising:

a processor of the computer, allocating portions of memory to be protected by a lock mechanism and an associated sequence number, wherein the lock mechanism supports synchronization between one or more writers accessing the allocated portions of memory, and the associated sequence number indicates consistency between one or more readers of the allocated portions of memory; and the processor, initializing a pointer within a first portion of memory of the allocated portions of memory, the pointer pointing to a second portion of memory of the allocated portions of memory forming a linked list to be protected by the lock mechanism and the associated sequence number, wherein the pointer within the first portion of memory remains unchanged.

12. The method of claim 11, wherein the lock mechanism and the associated sequence number are operated in accordance with the seqlock technique.

13. The method of claim 12, wherein the seqlock technique is performed together with an always valid end iterator.

14. The method of claim 11, wherein the linked list is singly linked.

15. The method of claim 11, wherein the portions of memory include shared variables between a first parallel operating system routine and a second parallel operating system routine.

16. A computer system including at least one processor for executing program code and memory for storing data structures with pointers, the system comprising:

the memory storing a seqlock allocator module, the seqlock allocator module to allocate portions of memory to be protected by a lock mechanism and an associated sequence number, wherein the lock mechanism supports synchronization between one or more writers accessing the allocated portions of memory, and the associated sequence number indicates consistency between one or more readers of the allocated portions of memory; and the memory storing a pointer initializer module, the pointer initializer module to initialize a pointer within a first portion of memory of the allocated portions of memory, the pointer pointing at a second portion of memory of the allocated portions of memory forming a linked list to be protected by the lock mechanism and the associated sequence number, wherein the pointer within the first portion of memory remains unchanged.

17. The system of claim 16, wherein the lock mechanism and the associated sequence number are operated in accordance with the seqlock technique.

18. The system of claim 17, wherein the seqlock technique is performed together with an always valid end iterator.

19. The system of claim 16, wherein the linked list is singly linked.

20. The system of claim 16, wherein the portions of memory include shared variables between a first parallel operating system routine and a second parallel operating system routine

* * * * *